June 30, 1970 M. L. AVIGNON 3,518,560

DETECTOR FOR BIPOLAR BINARY SIGNALS WITH DISTORTION CORRECTION CAPABILITY

Filed Oct. 26, 1967

Inventor

MICHEL L. AVIGNON

By Alfred C. Hill

Agent

United States Patent Office 3,518,560
Patented June 30, 1970

3,518,560
DETECTOR FOR BIPOLAR BINARY SIGNALS WITH DISTORTION CORRECTION CAPABILITY

Michel Louis Avignon, Neuilly-sur-Seine, France, assignor to International Standard Electric Corporation, New York, N.Y., a corporation of Delaware Filed Oct. 26, 1967, Ser. No. 678,278
Claims priority, application France, Nov. 3, 1966, 82,287
Int. Cl. H03d *1/06;* H03k *5/20*
U.S. Cl. 329—104 10 Claims

ABSTRACT OF THE DISCLOSURE

A differential amplifier having a threshold level and a symmetrical detector detects the bipolar pulses and delivers single polarity pulses. A feedback circuit responds to the delivered pulses to control the threshold level to overcome distortion in the bipolar signals. The feedback circuit includes a peak detector to maintain a constant ratio of signal amplitude to threshold level, or a pulse shaper and low pass filter to maintain the width of the output pulses constant.

Background of the invention

This invention relates to pulse detectors in a pulse code modulation (PCM) receiving station and, more particularly to such detectors for bipolar type binary signals.

The process of transmitting binary signals by alternate polarity pulses (or BNRZL=binary nonreturn to zero level), that is, bipolar binary signals, consists in representing binary 1's by pulses having alternate positive and negative polarities and binary 0 by zero level.

It is known that each transmission line acts as a low-pass filter so that an equalizer must be placed at the input of each repeater, said equalizer having such a characteristic that the whole acts as a low-pass filter, the pass-band of which is sufficiently wide not to give overshoots of the pulses and yet limited to reduce the noise-band.

The signals delivered by the equalizer are then applied to a detector that is generally constituted, in the case of bipolar pulses, by a symmetrical threshold rectifier which delivers a signal representing a digit 1 when the absolute value of the input signal amplitude is greater than the threshold value. However, before detection, the signals have undergone distortions due to the imperfection of the equalizer and spurious signals are superposed on them so that their shape and their amplitude vary such that a digit 0 is represented by a nonzero signal with variable amplitude. It results that, with a constant detection threshold, errors may appear transforming 1's into 0's and inversely.

Summary of the invention

An object of the present invention is to provide a detector for bipolar binary signals having an automatically controlled detection threshold to compensate for distortions in the bipolar binary signals.

Another object of the present invention is to provide a detector for bipolar binary signals where the detection threshold is automatically controlled either by the peak amplitude of the detected signals representing a binary 1, or by the average value of reshaped detected signals to compensate for distortions in the bipolar binary signals.

A feature of the present invention is the provision of a detector for bipolar binary signals having distortions therein comprising a first source of the binary signals; a second source of threshold voltage; first means coupled to the first and second sources to provide output pulses of a given polarity when the absolute value of the binary signals exceeds the value of the threshold voltage; and second means coupled to the first means and the second source responsive to the output pulses to control the value of the threshold voltage to compensate for the distortions.

Another feature of the present invention is that the above-mentioned second means includes a peak detector responsive to the output pulses to control the value of the threshold voltage to maintain the ratio between the value of the threshold voltage and the value of the binary signal constant.

A further feature of the present invention is that the above-mentioned second means includes pulse shaping means responsive to the output pulses to produce rectangular pulses, and a low pass filter coupled to the pulse shaping means responsive to the rectangular pulses to control the value of the threshold voltage to maintain the width of the rectangular pulses constant regardless of variations in the amplitude of the binary signal.

Brief description of the drawing

The above-mentioned and other features and objects of this invention will become more apparent by reference to the following description taken in conjunction with the accompanying drawings, in which.

Description of the preferred embodiments

Figures 1A, 1B, 1C, 1D:
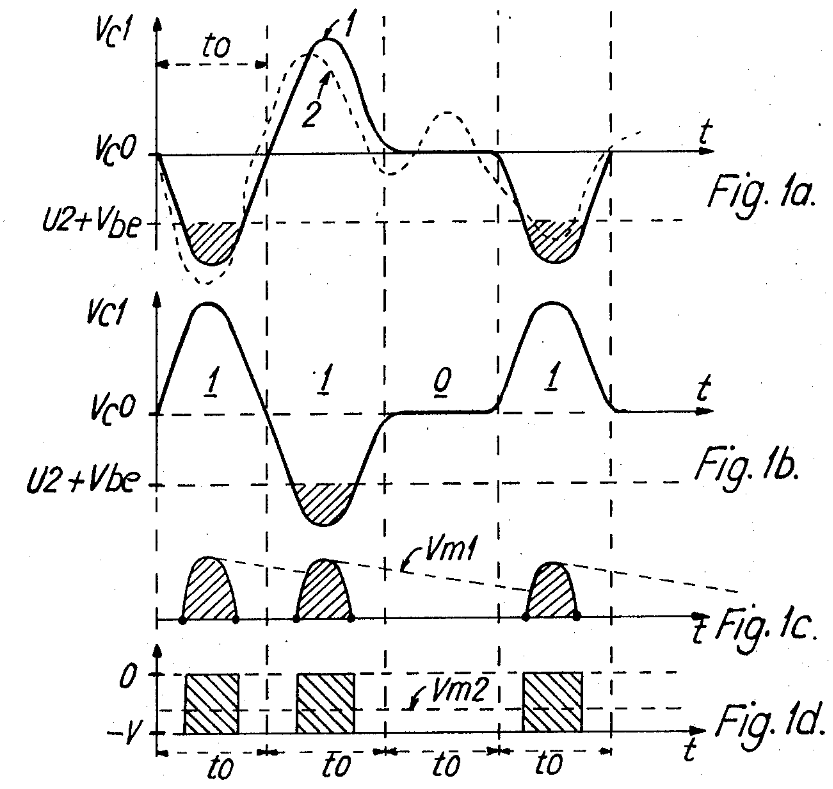
FIGS. 1*a* to 1*d* illustrate diagrams of the signals appearing at various points in the detector of FIG. 2.

FIG. 1*a* illustrates in solid lines (curve 1), the ideal shape of the received bipolar binary signals for the binary number 1101, and, in dotted lines (curve 2), the shape of the signals actually received in which there is amplitude and phase distortion, as well as noise (signal not equal to zero for the reception of a 0). It can be seen that the first negative half-wave of the signal presents an amplitude much higher than that of the next positive half-wave, and that a detection threshold wrongly chosen may yield errors. On the other hand, such errors can be avoided by relating the value of this threshold to the value of the signals. Moreover, by a suitable choice of the value of the threshold, signals can be obtained which, after reshaping, have an average width normalized to $to/2$.

It will be assumed, in first approximation, that each signal corresponding to a digit 1 is a half sine wave with a width $to$ at its base. If the detection threshold is chosen equal to half of the peak amplitude of the signal—which corresponds to a signal-to-noise ratio of 6 db—the duration of the detected signal will be $$\frac{2\,to}{3}$$

However, it should be noted that, for signals of the cosine squared type, the ratio of 6 db corresponds exactly to a duration $to/2$ of the detected signals.

Figure 2:
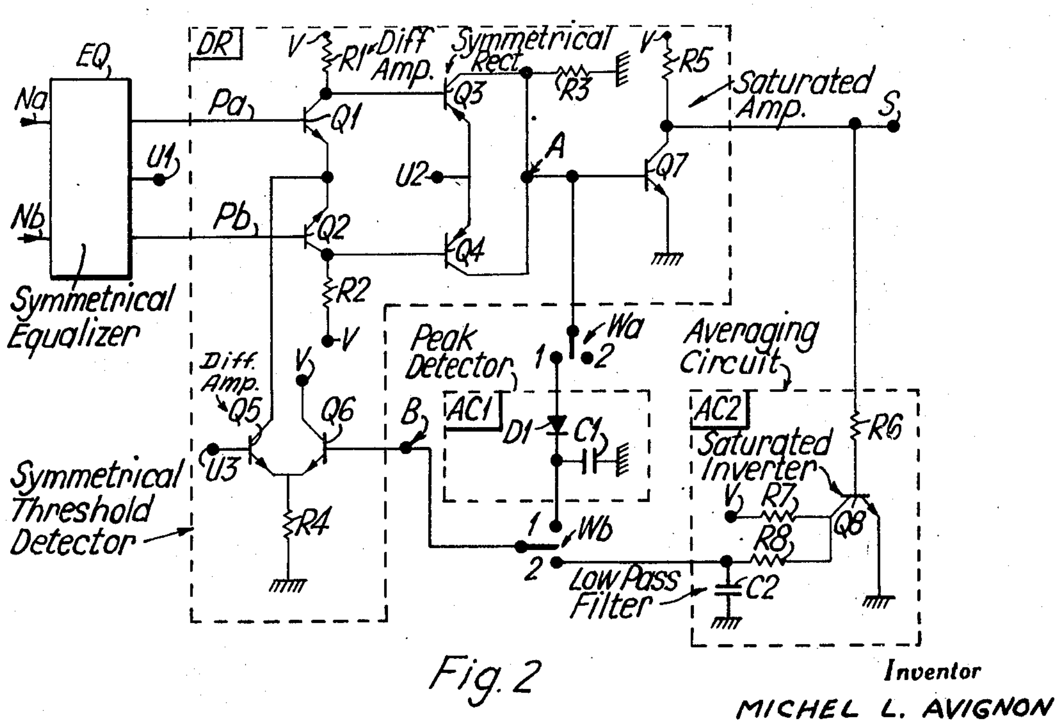
FIG. 2 is a schematic diagram of a detector in accordance with the principles of the present invention.

FIG. 2 is a schematic diagram of the detector according to the invention which comprises symmetrical threshold detector DR, and either of the two circuits AC1 or AC2 for the automatic control of the pulse width. These circuits AC1 or AC2 are connected to the detector by setting the switches W*a* and W*b*, respectively, in position 1 and 2. This figure also shows symmetrical equalizer EQ, to which are applied the signals received on the wires N*a* and N*b* from the symmetrical transmission line and which delivers, on its output P*a* and P*b* signals which are symmetrical with respect to the positive reference potential U1.

Detector DR comprises:

A differential amplifier comprising NPN transistors Q1, Q2 and Q5 and resistors R1, R2 ($R1=R2$), R4. A positive potential U3 is applied to the base of transistor Q5. This circuit also comprises transistor Q6 the emitter of which is connected to the emitter of transistor Q5, but it will be temporarily supposed that it is blocked by connecting point B to ground;

A symmetrical rectifier comprising NPN transistors Q3, Q4 and resistor R3. Positive potential U2 is applied to the emitters of the transistors; and A saturated amplifier comprising NPN transistor Q7 and resistor R5.

In the absence of signals on inputs N*a* and N*b*, the bases of transistors Q1 and Q2 are brought to potential U1. Moreover, the base-to-emitter junction to transistor Q5 is conducting since its base is at the potential U3. Hence, transistors Q1, Q2 and Q5 are conducting if $U1>U3+Vo$, V*o* being the saturation voltage of transistor Q5, i.e. the value of the collector to emitter voltage beyond which the transistor approximates a constant current generator. This current has a value of about $$\frac{U3}{R4}$$

and it is equally divided between transistors Q1 and Q2. Voltage U1 is chosen so that these transistors operate in class A and their collector voltages are equal to $$Vco=V-\frac{U3}{2}\times\frac{R1}{R4} \qquad (1)$$

In the presence of a signal on inputs N*a* and N*b*, a difference of potential ΔE is set between the bases of transistors Q1 and Q2, and their collector voltages vary oppositely by an equal quantity, yielding the following equations:

$$Vc1=Vco-m\times\Delta E$$

$$Vc2=Vco+m\times\Delta E.$$

In these equations, V*c*1 and V*c*2 represent the collector voltages of the transistors Q1 and Q2, and *m* the differential amplifier gain. It will be noticed that ΔE can be either positive or negative. The emitters of transistors Q3 and Q4 constituting the symmetrical rectifier are set to potential U2, that is, lower than V*co*, so that for $\Delta E=0$, these transistors are blocked.

When /ΔE/ increases from zero up, one of the voltages V*c*1 or V*co* decreases by $m\times\Delta E$ and the corresponding transistor of the rectifier becomes conducting when $Vco+m\times\Delta E<U2+Vbe$, and the potential of the point A becomes positive (V*be* designates the base to emitter voltage drop of the transistor when conducting). Transistor Q7 is then saturated, and the potential of terminal S passes from the value +V to the value zero that characterizes a digit 1.

The voltage threshold above which one of transistors Q3 or Q4 becomes conducting, therefore, depends, particularly, on the voltage V*co*, and it is seen, according to the Equation 1, that the value of this threshold can be adjusted by modifying voltage U3.

FIGS. 1*a* and 1*b* represent in solid lines the signals of amplitude $/m\times\Delta E/$ delivered by the differential amplifier when the input signals correspond to the code 1101, the first signal of each of these figures corresponding to a positive value of ΔE.

The hatched signals of FIG. 1*c* are the positive signals appearing at point A and correspond to the digits 1.

It will be noticed that a modification of voltage U3 causes a shift of the voltage $U2\pm m\times E$ with respect to the voltage $U2+Vbe$ with a corresponding variation of the pulse width at the point A (FIG. 1*c*).

In the general case, when the digits 0 and 1 are distributed at random, circuit AC1 is used for the automatic control of the threshold voltage. This circuit, which is connected to detector DR by setting switches W*a* and W*b* to position 1, is a peak detector comprising diode D1 and capacitor C1, and it delivers, at the point B, a positive voltage V*m*1 represented in dotted lines in FIG. 1*c*. If R is the input impedance of transistor Q6, the base of which is connected to point B, the voltage drop V*n*1 between two consecutive pulses is proportional to *to*/RC1, *to* being the duration of a digit time slot. It is seen that this drop can be made very low by choosing a high value for C1, so that the voltage V*m*1 is practically constant between two consecutive pulses and characterizes the threshold voltage and the signal width.

Transistors Q5 and Q6 constitute a differential amplifier and the collector current I of transistor Q5 decreases when the potential V*m*1 of point B increases, and inversely.

Consequently, when the amplitude of the signals delivered by the rectifier increases, the voltage V*co* increases which causes—as it can be seen in FIGS. 1*a* and 1*b*—a reduction of the amplitude and of the width of these signals. It results that the voltage V*m*1 controls the threshold voltage in order to maintain the detection threshold to a given fraction of the signal amplitude, the value of which depends on the value of potential U3. It will be noticed that the measure of the peak amplitude is only valid if said amplitude is practically constant in in the time, which does not occur when there is crosstalk between the received signals.

In the special case when digits 0 and 1 are received, on the average, in equal numbers during time intervals T*o*, circuit AC2 will be used, this being generally the case for coded speech signals. This circuit, that is connected to the detector DR by setting switches W*a* and W*b* in position 2, is an averaging circuit comprising NPN transistor Q8, resistors R6 to R8 and capacitor C2.

It has been seen, when describing circuit DR, that the digits 1 and 0 were charatcerized, respectively, by a zero potential and a +V potential on the output S. These signals are applied to transistor Q8 that operates as a saturated inverter and delivers the signals illustrated in FIG. 1*d*. These signals of amplitude V are applied to the averaging circuit or low-pass filter constituted by elements R8 and C2, which delivers, on the output connected to the point B, a voltage V*m*2 that represents the average value of the signals appearing at the point S if $T<To$, T indicating the time constant of the filter. As these signals must have a duration *to*/2, we have:

$$Vm2=\frac{V}{4}$$

This voltage V*m*2 acts on the detector in the same way as the voltage V*m*1 and controls the threshold voltage so that the average durtaion of the signal S corresponding to digits 1 be equal to *to*/2. In this circuit, the value of the threshold voltage is equal to the average value of the signals which is constant, so that crosstalk effect is practically cancelled.

Opposite polarity transistors can be used by reversing the connections of the diodes and the polarity of the power supply sources.

I claim:

1. A detector for bipolar binary signals having distortions therein comprising:
- a first source of said binary signals;
- a second source of amplitude threshold bias voltage;
- first means coupled to said first and second sources to provide output pulses of a given polarity when the absolute value of said binary signals exceeds the value of said threshold voltage; and
- second means coupled to said first means and said second source responsive to said output pulses to control the amplitude value of said threshold voltage to compensate for said distortions.

2. A detector according to claim 1, wherein said first means includes:
- a differential amplifier coupled to said first and second sources; and
- a symmetrical detector coupled to said differential amplifier to provide said output pulses.

3. A detector according to claim 1, wherein said second means includes:

a peak detector coupled to said first means and said second source responsive to said output pulses to control the value of said threshold voltage to maintain the ratio between the value of said threshold voltage and the value of said binary signal constant.

4. A detector according to claim 1, wherein said second means includes:

pulse shaping means coupled to said first means responsive to said output pulses to produce rectangular pulses; and a low pass filter coupled to said pulse shaping means and said second source responsive to said rectangular pulses to control the value of said threshold voltage to maintain the width of said rectangular pulses constant regardless of variations in the amplitude of said binary signal.

5. A detector according to claim 4, wherein said pulse shaping means includes:

a saturated amplifier coupled to said first means to produce said rectangular pulses; and a saturated inverter coupled between said saturated amplifier and said low pass filter.

6. A detector according to claim 1, wherein said first source includes:

a pair of conductors over which said binary signals are transmitted.

7. A detector according to claim 6, wherein said first means includes:

a differential amplifier coupled to said conductors and said second source; and a symmetrical detector coupled to said differential amplifier to provide said output pulses.

8. A detector according to claim 7, wherein said second means includes:

a peaked detector coupled to said symmetrical detector and said second source responsive to said output pulses to control the value of said threshold voltage to maintain the ratio between the value of said threshold voltage and the value of said binary signal constant.

9. A detector according to claim 7, wherein said second means includes:

pulse shaping means coupled to said symmetrical detector responsive to said output pulses to produce rectangular pulses; and a low pass filter coupled to said pulse shaping means and said second source responsive to said rectangular pulses to control the value of said threshold voltage to maintain the width of said rectangular pulses constant regardless of variations in the amplitude of said binary signals.

10. A detector according to claim 1, wherein said second source includes:

a voltage source; and a differential amplifier coupled to said first means, said voltage source and said second means to enable the control of the amplitude value of said threshold voltage.

References Cited

UNITED STATES PATENTS

| | | | |
|---|---|---|---|
| 3,244,986 | 4/1966 | Rumble | 328—118 X |
| 3,310,751 | 3/1967 | Atzenbeck | 328—163 |
| 3,305,786 | 2/1967 | Smith | 329—104 |
| 3,391,344 | 7/1968 | Goldberg | 329—104 X |
| 3,409,833 | 11/1968 | Dalton | 329—104 X |

ALFRED L. BRODY, Primary Examiner

U.S. Cl. X.R.

329—169, 192; 328—118, 163; 307—236; 325—324